United States Patent [19]

Bednarz

[11] 4,148,595

[45] Apr. 10, 1979

[54] COATING FOR AERODYNAMIC SHIELD IN APPARATUS FOR MAKING NON-WOVEN WEB

[75] Inventor: Thomas K. Bednarz, Richmond, Va.

[73] Assignee: E. I. Du Pont de Nemours and Company, Wilmington, Del.

[21] Appl. No.: 837,630

[22] Filed: Sep. 28, 1977

[51] Int. Cl.[2] .............................................. B29C 23/00

[52] U.S. Cl. ................................ 425/75; 425/174.8 E; 264/22

[58] Field of Search ....................... 425/3, 75, 174.8 E, 425/72; 264/22, 176 R

[56] References Cited

U.S. PATENT DOCUMENTS 3,860,369 1/1975 Brethauer et al. ....................... 425/3

*Primary Examiner*—Robert L. Spicer, Jr.

[57] ABSTRACT

The aerodynamic shield members of the apparatus for electrostatically charging fibrous material disclosed in U.S. Pat. No. 3,860,369 are coated with a material having a resistance of between $5 \times 10^{12}$ and $10^{14}$ ohms/sq to reduce arcing at higher charge levels.

1 Claim, 2 Drawing Figures

COATING FOR AERODYNAMIC SHIELD IN APPARATUS FOR MAKING NON-WOVEN WEB

BACKGROUND OF THE INVENTION

This invention relates to an improved apparatus for applying an electrostatic charge to fibrous structures and depositing them on a moving receiver to form a nonwoven sheet. More particularly, it relates to an improvement in the aerodynamic shield disclosed in U.S. Pat. No. 3,860,369.

Associated with the flash spinning of fibrous structures is the need to impart a higher electrical charge to the structure to improve uniformity of the nonwoven sheet structure deposited on the receiver. The higher the charge applied the more uniform is the resultant nonwoven sheet. A consequence of increasing the level of charge applied to the fibrous structure is an increase in charge build up on the aerodynamic shield members which have a resistance of about $10^{17}$ ohms/sq. When a sufficient surface charge is built up on the aerodynamic shield members, arcing on the surface of and between shield members occurs which in turn discharges a portion of the fibrous structure as it passes between the shield members to the receiver leading to web collapse and sheet imperfections.

Previous solutions to arcing between aerodynamic shield members involved reducing the amount of charge imparted to the fibrous structure which consequently resulted in poorer sheet uniformity.

SUMMARY OF THE INVENTION

In accordance with the invention, the surfaces of the front and rear aerodynamic shield members are disclosed in U.S. Pat. No. 3,860,369 which face the path of the fibrous structure as it moves downward toward a collecting surface are coated with a material having a stable resistance of between $5 \times 10^{12}$ and $10^{14}$ ohms/sq which is slightly conductive when compared to the resistance of $10^{17}$ ohms/sq of the prior art aerodynmic shield members of the above identified patent and as a consequence permits surface charges to leak to the ground before they build up sufficiently to arc between shield members.

One preferred coating material is Hypalon ® chlorosulfonated-polyethylene which is formulated to include a filler of magnesium and calcium oxides and carbonates, a plasticizer and carbon black.

As used herein, stable resistance means that the surface resistance of the coating material remains within the specified limits of between $5 \times 10^{12}$ and $10^{14}$ ohms/sq for at least 48 hours during operation of the apparatus, i.e., while exposed to spin cell atmosphere, corona discharge, web/gas erosion, etc.

DETAILED DESCRIPTION OF THE PREFERRED EMBODIMENT

Figure 1:
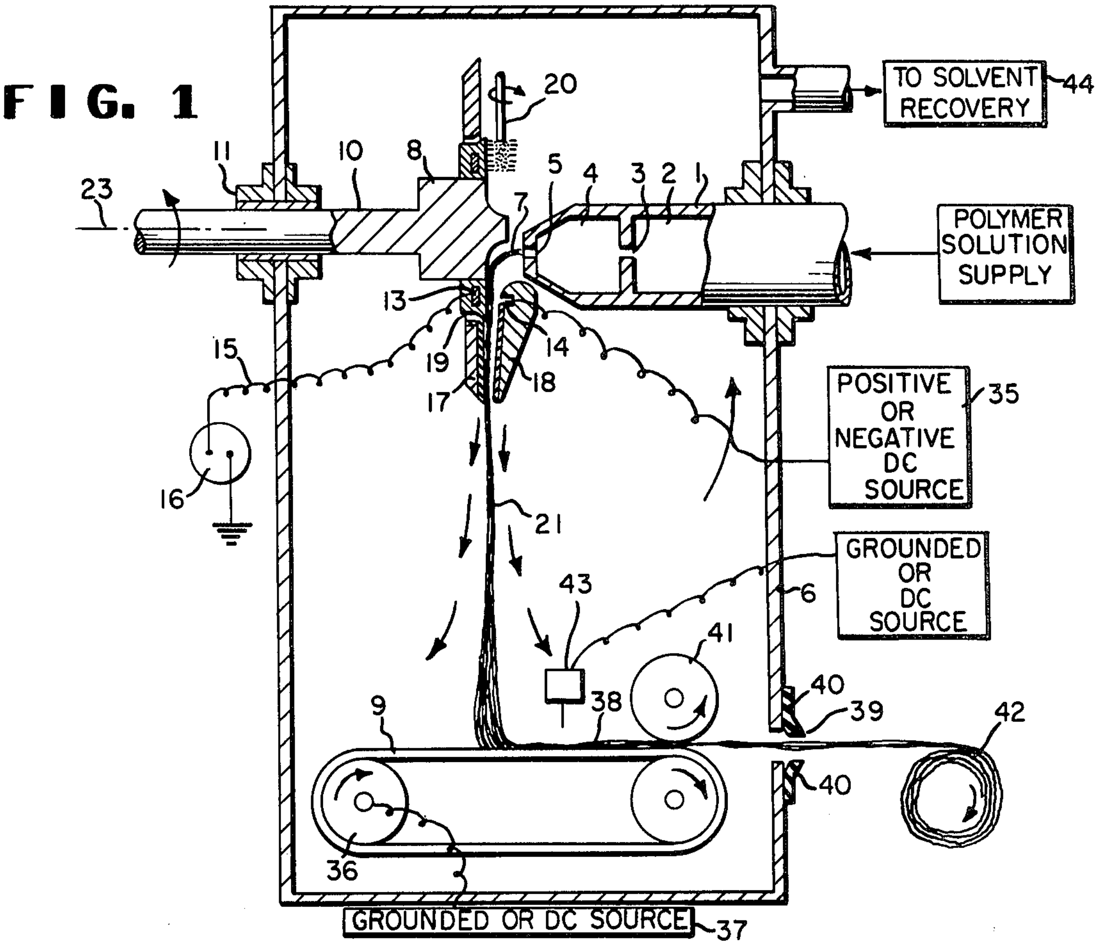
FIG. 1 is a schematic cross-sectional elevation indicating the arrangement of various elements of the apparatus of this invention similar to FIG. 1 of U.S. Pat. No. 3,860,369.

The apparatus chosen for purposes of illustration is similar to that disclosed in U.S. Pat. No. 3,860,369 and includes generally a spinneret device 1 positioned opposite a baffle 8, an aerodynamic shield comprised of members 13, 17 and 18 located below the baffle 8 and a collecting surface 9 below the aerodynamic shield. A more detailed description is found at column 3, line 41 to column 4, line 63 of that patent.

Figure 2:
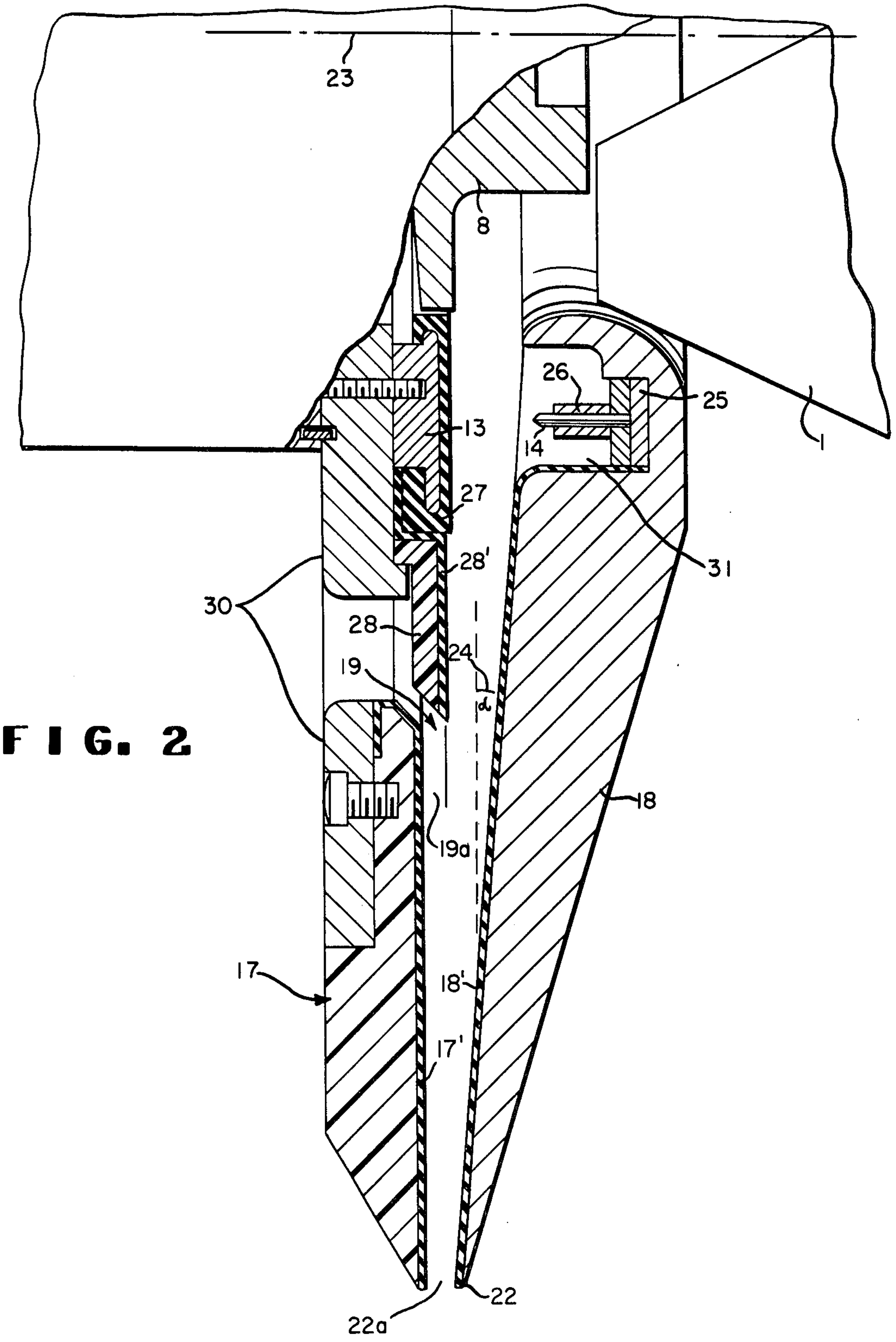
FIG. 2 is a more detailed enlarged view of the aerodynamic shield of the apparatus of FIG. 1 illustrating the preferred embodiment of the invention.

FIG. 2 is an enlarged cross-sectional view of a portion of the aerodynamic shield similar to that depicted in FIG. 2 of U.S. Pat. No. 3,860,369 and described in column 4, line 64, to column 5, line 15, but differing in the inclusion of coating 17', on the web facing surface of the concentric annular segment 17 of the rear shield member, coating 18' on the web facing surface of the front member 18 and coating 28' on the web facing surface of the annular target plate extension 28.

A preferred material for coatings 17', 18' and 28' is Hypalon ® chlorosulfonated-polyethylene formulated as follows:

| | Parts per 100 parts of base material |
|---|---|
| Base material - Hypalon ® | 100 |
| Filler - Magnesium and calcium oxides and carbonates | 100 |
| Plasticizer | 40 |
| Carbon Black | 0-50 |

A preconditioning treatment for the coatings has been found to insure stable resistivity. This preconditioning involves placing the coating parts to be treated in a closed container along with a small beaker of concentrated hydrochloric acid at room temperature for approximately 1½ hours.

In order to illustrate the improved uniformity of nonwoven sheets made possible by the present invention particularly at higher charge levels, a series of samples is prepared with the apparatus according to the Example in U.S. Pat. No. 3,860,369 and compared with similar samples wherein the apparatus includes coatings 17', 18' and 28' each 100 mils thick of Hypalon ® as formulated above having a resistance of between $5 \times 10^{12}$ and $10^{14}$ ohms/sq applied to aerodynamic shield members 17, 18 and 28 as shown in FIG. 2. Percent coefficient of variation of basis weight uniformity (percent CV) as described in column 6, lines 59–68 of U.S. Pat. No. 3,860,369 is used as the criterion.

The specific parameters employed for the samples are listed in Table I.

Table I

| Conc. % | Solution Temp. ° C | Pres. psig | Tunnel L/D (in) | Flow Rate (pph polymer) | Swath Width (in) |
|---|---|---|---|---|---|
| 11.7 | 180 | 900 | 0.330/ 0.330 | 125 | 24 |

A multiposition test to prepare the samples consists of seven adjacent spinning positions having coated parts according to the invention; these samples run at charge levels of approximately 8.1 and 9.0 microcoulombs/-gram are compared with samples made from 20 standard positions having uncoated parts run at an average maximum attainable charge level of 7.5 microcoulombs/gram.

The percentage improvement in CV of the positions having coated parts according to the invention over the positions having uncoated parts at different basis weights is shown in Table II.

Table II

| Basis Weight oz/yd$^2$ | % Improvement in CV at Web Charge of 8.1 $\mu c/g$ | % Improvement in CV at Web Charge of 9.0 $\mu c/g$ |
|---|---|---|
| 1.15 | 12 | 19 |
| 1.6 | 8 | 12 |
| 2.2 | 9 | 13 |
| 2.95 | 3 | 10 |

In addition to an improvement in web uniformity an increase in spinning unit pack life is obtained with the packs having coated parts because they are found to be more consistent in maintaining their charging efficiency with time than are packs having uncoated parts.

What is claimed is:

1. In an apparatus for forming a fibrous web that includes a chamber containing therein a means for flash spinning a polymer solution to form a plexifilamentary strand entrained in a gaseous stream, means at one location for spreading the strand to form a web and oscillating the web in a generally vertical plane in a plurality of downward radial directions toward a collecting surface, an ion gun connected to a high voltage power source, and an opposed grounded target electrode positioned on opposite sides of said plane whereby a corona discharge occurs between said ion gun and said target electrode, said target electrode having a surface facing said ion gun, said surface of said target electrode facing said ion gun being covered with a material having a resistance of between $1 \times 10^6$ ohms and $10^{10}$ ohms, and an aerodynamic shield having front and rear members disposed on each side of said plane below said ion gun and said target electrode, said members having surfaces facing said plane, the improvement comprising: said surfaces of said front and rear members facing said plane being covered by a slightly conductive material having a stable resistance of between $5 \times 10^{12}$ and $10^{14}$ ohms/sq.

* * * * *